No. 778,244. PATENTED DEC. 27, 1904.
H. T. HOWARD.
FISHING REEL.
APPLICATION FILED APR. 13, 1904.
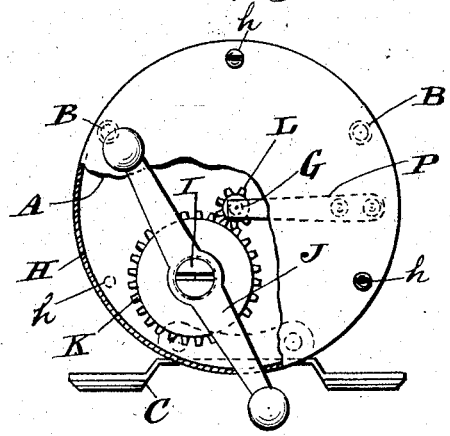
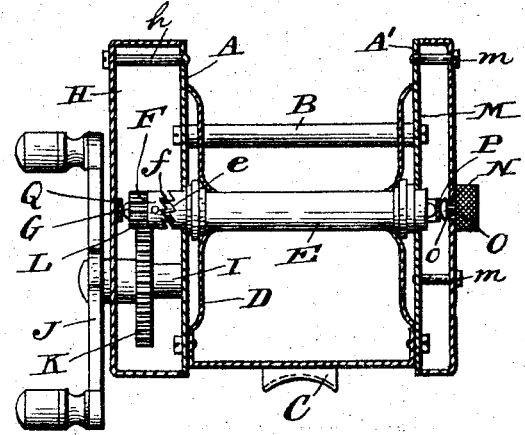
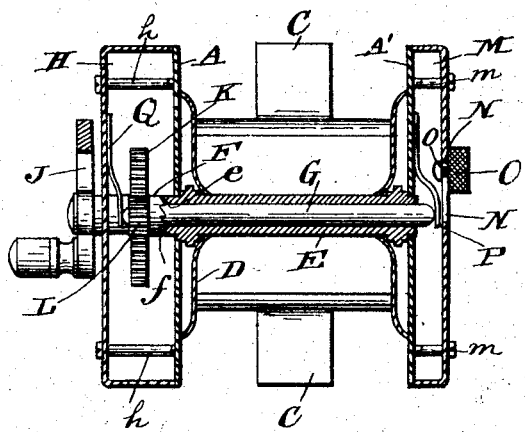

No. 778,244.	Patented December 27, 1904.

UNITED STATES PATENT OFFICE.

HORATIO T. HOWARD, OF HEBRON, INDIANA.

FISHING-REEL.

SPECIFICATION forming part of Letters Patent No. 778,244, dated December 27, 1904.

Application filed April 13, 1904. Serial No. 203,007.

*To all whom it may concern:*

Be it known that I, HORATIO T. HOWARD, a citizen of the United States, residing at Hebron, in the county of Porter and State of Indiana, have invented certain new and useful Improvements in Fishing-Reels, of which the following is a specification.

My invention relates to fishing-reels, and has for its object the provision of a reel in which the spool may be quickly thrown into and out of gear with the crank-handle, the construction for carrying this object into effect being of simple character, so that the mechanism will not get out of order and at the same time the cost of manufacture of the reel not greatly enhanced.

The construction and advantages of my invention will fully appear hereinafter and by reference to the accompanying drawings, in which—

Figure 1 is a side view of a reel involving my invention, partly broken away to disclose the gearing; Fig. 2, a central vertical sectional view of Fig. 1, and Fig. 3 a central horizontal sectional view of Fig. 1.

In the drawings similar reference characters indicate corresponding parts throughout the several views.

A and A' represent the two side plates of my reel, which are connected by any desired number of tie-bars B and have a clip C secured thereto to permit the reel to be secured to the pole in the ordinary manner usually employed.

D represents the spool, having a hollow shaft E journaled in the plates A and A', one end of said hollow shaft E having a clutch-face $e$, adapted to intermember with clutch-face $f$ of clutch-sleeve F, secured to bar G, slidably mounted in hollow shaft E.

H represents a boxing secured to plate A by means of screws or rivets $h$.

I represents an axle journaled in plate A and boxing H and having secured thereto a suitable crank-handle J for operating the reel and a gear-wheel K keyed thereto inside of the boxing H and meshing with a gear-face L, integral with sleeve F.

M represents a boxing secured to plate A' by means of screws or rivets $m$, having a slot N therein in which is slidably mounted a button O, having a shank $o$ extending inside of the boxing M and adapted to bear against leaf-spring P, secured to plate A' and having its free end resting against the end of bar G.

It will be understood from this description that when the button O is slid so that its shank $o$ travels toward the free end of spring P the spring is depressed and the bar G slid in shaft E so that the clutch-faces $e$ and $f$ do not intermember and the spool D is free to rotate independently of the crank J. When the button O is slid in the opposite direction, spring Q, secured to boxing H, pushes the bar G back again, so that the clutch-faces $e$ and $f$ intermember and spool D rotates only in conjunction with crank J.

Having thus described my invention, what I claim is—

1. In a fishing-reel, side plates, a spool having a tubular shaft and journaled in said side plates, a bar slidably mounted in said tubular shaft, a clutch-face on said tubular shaft, a clutch-sleeve secured to said bar and having a gear-face integral therewith, a gear-wheel keyed to a drive-shaft and meshing with said gear-face, and means to slide said clutch-sleeve into and out of mesh with said clutch-face, substantially as shown and described.

2. In a fishing-reel, side plates, a spool having a tubular shaft and journaled in said side plates, a bar slidably mounted in said tubular shaft, a clutch-sleeve secured to said bar and having a gear-face integral therewith, a gear-wheel keyed to a drive-shaft and meshing with said gear-face, a spring-tongue secured to one of said side plates and having its free end over said slidable bar, a button slidably mounted and adapted to depress said spring and slide said bar, and a leaf-spring to return said bar to its normal position when the pressure of said button is removed, substantially as shown and described.

In testimony whereof I hereto affix my signature in the presence of two witnesses.

HORATIO T. HOWARD.

Witnesses:
  JOHN RYAN,
  FRANK LING.